(12) United States Patent
Yoshida et al.

(10) Patent No.: US 8,116,013 B2
(45) Date of Patent: Feb. 14, 2012

(54) WIDE-ANGLE LENS AND IMAGE PICKUP APPARATUS

(75) Inventors: Hayato Yoshida, Iwate (JP); Issei Abe, Kanagawa (JP); Naoki Moniwa, Iwate (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/728,556

(22) Filed: Mar. 22, 2010

(65) Prior Publication Data

US 2010/0254025 A1  Oct. 7, 2010

(30) Foreign Application Priority Data

Apr. 3, 2009 (JP) ................................. 2009-091113

(51) Int. Cl.
*G02B 13/18* (2006.01)
(52) U.S. Cl. ........................................ 359/714; 359/770
(58) Field of Classification Search .................. 359/714, 359/717, 763, 770
See application file for complete search history.

(56) References Cited

U.S. PATENT DOCUMENTS

| | | | | |
|---|---|---|---|---|
| 5,579,169 | A | * | 11/1996 | Mouri ........................... 359/682 |
| 6,825,993 | B2 | * | 11/2004 | Noda ............................ 359/749 |
| 2009/0009888 | A1 | * | 1/2009 | Asami .......................... 359/770 |
| 2009/0122422 | A1 | | 5/2009 | Yoshida et al. |

FOREIGN PATENT DOCUMENTS

| | | |
|---|---|---|
| JP | 2006-98942 | 4/2006 |
| JP | 2006-284620 | 10/2006 |

* cited by examiner

*Primary Examiner* — Darryl J Collins
(74) *Attorney, Agent, or Firm* — Oblon, Spivak, McClelland, Maier & Neustadt, L.L.P.

(57) ABSTRACT

Disclosed is a wide-angle lens having a viewing angle of more than 130°. The wide angle lens has a front group, an aperture, and a rear group arranged in this order from an object side to an image side. The front group has a first lens as a negative lens, a second lens as a negative lens, and a third lens as a positive lens arranged from the object side to the image side. The rear group is a cemented lens having a positive power when two lenses are bonded to each other. The wide-angle lens constitutes an image forming system with the five lenses as a whole, the first lens and the second lens of the front group are aspherical lenses, and the third lens is a spherical lens.

4 Claims, 19 Drawing Sheets

FIG.2

| | CURVATURE RADIUS | SURFACE INTERVAL | REFRACTIVE INDEX | ABBE'S NUMBER | ASPHERICAL SURFACE |
|---|---|---|---|---|---|
| 1 | 57.345 | 0.700 | 1.49154 | 57.8 | ○ |
| 2 | 3.560 | 2.740 | | | ○ |
| 3 | −13.675 | 0.650 | 1.53046 | 55.8 | ○ |
| 4 | 2.025 | 0.730 | | | ○ |
| 5 | 4.505 | 3.990 | 1.83481 | 42.7 | |
| 6 | −4.505 | 0.110 | | | |
| 7(APERTURE) | | 0.220 | | | |
| 8 | 8.247 | 2.400 | 1.71300 | 53.9 | |
| 9 | −2.087 | 1.000 | 1.92286 | 18.9 | |
| 10 | −5.340 | 2.401 | | | |
| 11(CG) | | 0.550 | 1.53046 | 55.8 | |
| 12 | | 0.290 | | | |
| 13(IMAGE SURFACE) | | | | | |

FIG.3

ASPHERICAL SURFACE COEFFICIENT

| | K | A | B | C | D | E | F | G | H | I |
|---|---|---|---|---|---|---|---|---|---|---|
| 1 | 6.607E+01 | -5.896E-05 | 3.375E-05 | -9.649E-07 | 1.064E-08 | 2.180E-11 | -2.073E-13 | -6.588E-15 | -4.081E-17 | 1.799E-18 |
| 2 | 7.612E-01 | -9.722E-04 | 2.280E-04 | -2.688E-05 | 1.419E-06 | 2.138E-08 | 8.789E-09 | 1.437E-09 | 2.621E-11 | -4.771E-11 |
| 3 | -1.595E+02 | -8.378E-03 | -4.830E-04 | -9.195E-05 | 2.948E-05 | -9.059E-07 | -1.236E-07 | -2.201E-08 | 1.187E09 | 3.113E-10 |
| 4 | -4.211E-01 | 6.324E-03 | -6.365E-03 | 1.199E-03 | -2.416E-05 | -1.730E-05 | 1.766E-08 | 4.119E-11 | -1.238E-09 | 1.775E-10 |

DISTORTION IN THREE-DIMENSIONAL PROJECTION METHOD

| DESIGNED FOCAL LENGTH | 1.986 |
| --- | --- |

| VIEWING ANGLE | REAL IMAGE HEIGHT | VIEWING ANGLE (rad) | THREE-DIMENSIONAL IDEAL IMAGE HEIGHT IN CCDV DIRECTION | DIST (%) |
| --- | --- | --- | --- | --- |
| 0 | 0 | 0 | 0.0000 | 0.00% |
| 10 | 0.344697 | 0.174533 | 0.3475 | −0.81% |
| 20 | 0.678884 | 0.349066 | 0.7004 | −3.07% |
| 30 | 0.991084 | 0.523599 | 1.0643 | −6.88% |
| 40 | 1.27392 | 0.698132 | 1.4457 | −11.88% |
| 50 | 1.52589 | 0.872665 | 1.8522 | −17.62% |
| 60 | 1.75191 | 1.047198 | 2.2932 | −23.61% |
| 68 | 1.91797 | 1.186824 | 2.6791 | −28.41% |

FIG.10

| | CURVATURE RADIUS | SURFACE INTERVAL | REFRACTIVE INDEX | ABBE'S NUMBER | ASPHERICAL SURFACE |
|---|---|---|---|---|---|
| 1 | 19.231 | 1.000 | 1.49154 | 57.8 | O |
| 2 | 3.203 | 3.752 | | | O |
| 3 | -161.902 | 1.000 | 1.53046 | 55.8 | O |
| 4 | 1.866 | 0.765 | | | O |
| 5 | 7.240 | 1.805 | 1.83400 | 37.2 | |
| 6 | -3.899 | 0.365 | | | |
| 7(APERTURE) | | 0.500 | | | |
| 8 | 8.247 | 1.000 | 1.92286 | 18.9 | |
| 9 | 1.917 | 2.307 | 1.80610 | 40.9 | |
| 10 | -4.713 | 1.285 | | | |
| 11(CG) | | 1.000 | 1.53046 | 55.8 | |
| 12 | | 0.975 | | | |
| 13(IMAGE SURFACE) | | | | | |

FIG.11

ASPHERICAL SURFACE COEFFICIENT

| | K | A | B | C | D |
|---|---|---|---|---|---|
| 1 | -1.05E+03 | 1.14E-04 | 1.35E-07 | | |
| 2 | -1.51E+00 | 2.60E-03 | 5.48E-04 | 6.50E-06 | -9.26E-08 |
| 3 | 0.00E+00 | -1.96E-02 | -5.19E-04 | | |
| 4 | -1.36E+00 | 3.08E-03 | -8.21E-04 | -6.16E-04 | |

DISTORTION IN
THREE-DIMENSIONAL
PROJECTION METHOD

| DESIGNED FOCAL LENGTH | 1.803 |
|---|---|

| VIEWING ANGLE | REAL IMAGE HEIGHT | VIEWING ANGLE (rad) | THREE-DIMENSIONAL IDEAL IMAGE HEIGHT IN CCDV DIRECTION | DIST (%) |
|---|---|---|---|---|
| 0 | 0 | 0 | 0.0000 | 0.00% |
| 10 | 0.305 | 0.174533 | 0.3475 | −12.33% |
| 20 | 0.594 | 0.349066 | 0.7004 | −15.19% |
| 30 | 0.869 | 0.523599 | 1.0643 | −18.35% |
| 40 | 1.117 | 0.698132 | 1.4457 | −22.74% |
| 50 | 1.335 | 0.872665 | 1.8522 | −27.92% |
| 60 | 1.527 | 1.047198 | 2.2932 | −33.41% |
| 70 | 1.691 | 1.22173 | 2.7812 | −39.20% |
| 80 | 1.822 | 1.396263 | 3.3329 | −45.33% |
| 90 | 1.909 | 1.570796 | 3.9720 | −51.94% |
| 95 | 1.932 | 1.658063 | 4.3347 | −55.43% |

WIDE-ANGLE LENS AND IMAGE PICKUP APPARATUS

BACKGROUND OF THE INVENTION

1. Field of the Invention

The present invention relates to wide-angle lenses and image pickup apparatuses, and specifically to a wide-angle lens that corrects chromatic aberration with a cemented lens.

2. Description of the Related Art

Monitoring cameras and onboard cameras, in which an image forming lens is combined with an area sensor, are put into practical use. The image forming lens used in monitoring cameras, onboard cameras, etc., is preferably capable of picking up images in a wide image pickup range and required to have a wide viewing angle. Further, monitoring cameras and onboard cameras are frequently used out of doors, and brightness in image pickup environments greatly differs between the daytime and the nighttime. Therefore, the image forming lens is required to have high brightness so as to be capable of picking up images satisfactorily even at the nighttime.

Moreover, it is important that the image forming lens be small in order to meet demands for the miniaturization of monitoring cameras and onboard cameras.

As a wide-angle lens that corrects chromatic aberration with a cemented lens to obtain high resolution, Patent Document 1, for example, has disclosed one that has a viewing angle of more than 130° and an F-number of 2.8 as its brightness index.

However, when an image pickup apparatus with such a conventional wide-angle lens having an F-number of 2.8 is used, brightness in the image picked up in dark environments such as the nighttime is low, which in turn easily limits the usage of the image pickup apparatus.

Patent Document 1: JP-A-2006-284620

SUMMARY OF THE INVENTION

The present invention may have an object of providing a wide-angle lens, which has a viewing angle of more than 130° but is miniaturized and has higher brightness than a wide-angle lens having conventional brightness, i.e., an F-number of 2.8. Moreover, the present invention may have another object of providing an image pickup apparatus using such a wide-angle lens.

According to an aspect of the present invention, there is provided a wide-angle lens having a viewing angle of more than 130°, the wide angle lens having arranged therein a front group, an aperture, and a rear group in this order from an object side to an image side, the front group having arranged therein a first lens as a negative lens, a second lens as a negative lens, and a third lens as a positive lens from the object side to the image side, the rear group being a cemented lens having a positive power when two lenses are bonded to each other, wherein the wide-angle lens constitutes an image forming system with the five lenses as a whole, the first lens and the second lens of the front group are aspherical lenses, and the third lens is a spherical lens.

According to another aspect of the present invention, there is provided an image pickup apparatus having the wide-angle lens described above and an image pickup device that converts an image to be picked up, which is formed by the wide-angle lens, into image data.

As described above, the object of the embodiments of the present invention is to provide the wide-angle lens having a viewing angle of 130° and "greater brightness than" that of a wide-angle lens having conventional brightness, i.e., an F-number of 2.8.

The F-number as an index of brightness is obtained by dividing the focal length of a lens system by an incident pupil diameter. Therefore, it is only required to reduce the focal length and the incident pupil diameter when the F-number is made small to achieve desired brightness. However, in any case, an angle formed by an axial light and an off-axial light is likely to increase, which in turn easily causes an increase in chromatic aberration (particularly, magnification chromatic aberration) and degrades the quality of a pickup image.

The wide-angle lens according to the embodiments of the present invention has the "front group composed of the first through third lenses having negative, negative, and positive powers, respectively," and the "rear group composed of the cemented lens having a positive power when the two lenses are bonded to each other." Further, the wide-angle lens has the aperture arranged between the front and rear groups. With this configuration, the wide-angle lens corrects chromatic aberration with the cemented lens of the rear group, and corrects distortion by the combination of the first and second lenses of the front group as aspherical lenses and the third lens thereof as a spherical lens.

Moreover, the rear group is composed of a positive lens and a negative meniscus lens, and the negative meniscus lens is of a high-dispersion type that meets the condition (vdL<21). Thus, the wide-angle lens effectively corrects an "increase in chromatic aberration caused when the F-number is made small," thereby realizing an excellent pickup image.

In other words, in the front group, large magnification chromatic aberration is generated by the high dispersibility of the third lens having mainly a positive power, thereby facilitating the correction. The large chromatic aberration thus generated is satisfactorily corrected by the high dispersibility of the lens having a negative power of the rear group.

If the negative meniscus lens does not meet the above condition, the dispersibility of the cemented lens of the rear group is insufficient. Therefore, the wide-angle lens has a difficulty in sufficiently correcting chromatic aberration when the F-number is made substantially small.

In order to correct the aberration, the aspherical surfaces of the lenses are effective. As described above, the surfaces of the first and second lenses according to the embodiments of the present invention are aspherical.

Since any of the first lens and the second lens is separated from an "aperture position at which the diameter of image forming light flux becomes the smallest," axial light flux is separated from an off-axis light flux on the surfaces of these lenses. When the aspherical surfaces suitable for correcting the aberration of light fluxes are formed at the regions of the lenses adjacent to a light axis at which the axial light flux passes through and the peripheral regions of the lenses at which the off-axis light flux passes through, the wide-angle lens can desirably correct the aberration.

The aspherical surfaces of the first and second lenses bring about the above advantage, but lenses having aspherical surfaces are not limited to the first and second lenses.

To this end, the first and second lenses are preferably "resin lenses for easily forming the aspherical surfaces."

As described above, according to the embodiments of the present invention, the above configuration makes it possible to provide the wide-angle lens with greater brightness than that of a wide-angle lens having conventional brightness and satisfactorily corrects not only chromatic aberration but also distortion aberration and other aberrations. Thus, it is possible to provide an image pickup apparatus that can satisfactorily pick up images even in dark environments such as the nighttime.

Other objects, features and advantages of the present invention will become more apparent from the following detailed description when read in conjunction with the accompanying drawings.

BRIEF DESCRIPTION OF THE DRAWINGS

FIG. 1 is a diagram showing the configuration of a wide-angle lens according to an embodiment (first embodiment) of the present invention and also showing an axial light flux and a most off-axis light flux passing through;

FIG. 2 is a diagram showing the data of the wide-angle lens according to the first embodiment;

FIG. 3 is a diagram showing data of the aspherical surfaces of the wide-angle lens according to the first embodiment;

FIG. 9 is a diagram showing the configuration of a wide-angle lens according to another embodiment (second embodiment) of the present invention and also showing an axial light flux and a most off-axis light flux passing through;

FIG. 10 is a diagram showing the data of the wide-angle lens according to the second embodiment;

FIG. 11 is a diagram showing the data of the aspherical surfaces of the wide-angle lens according to the second embodiment;

DETAILED DESCRIPTION OF THE PREFERRED EMBODIMENTS

Next, embodiments of the present invention are described below with reference to the accompanying drawings.

Figure 1:
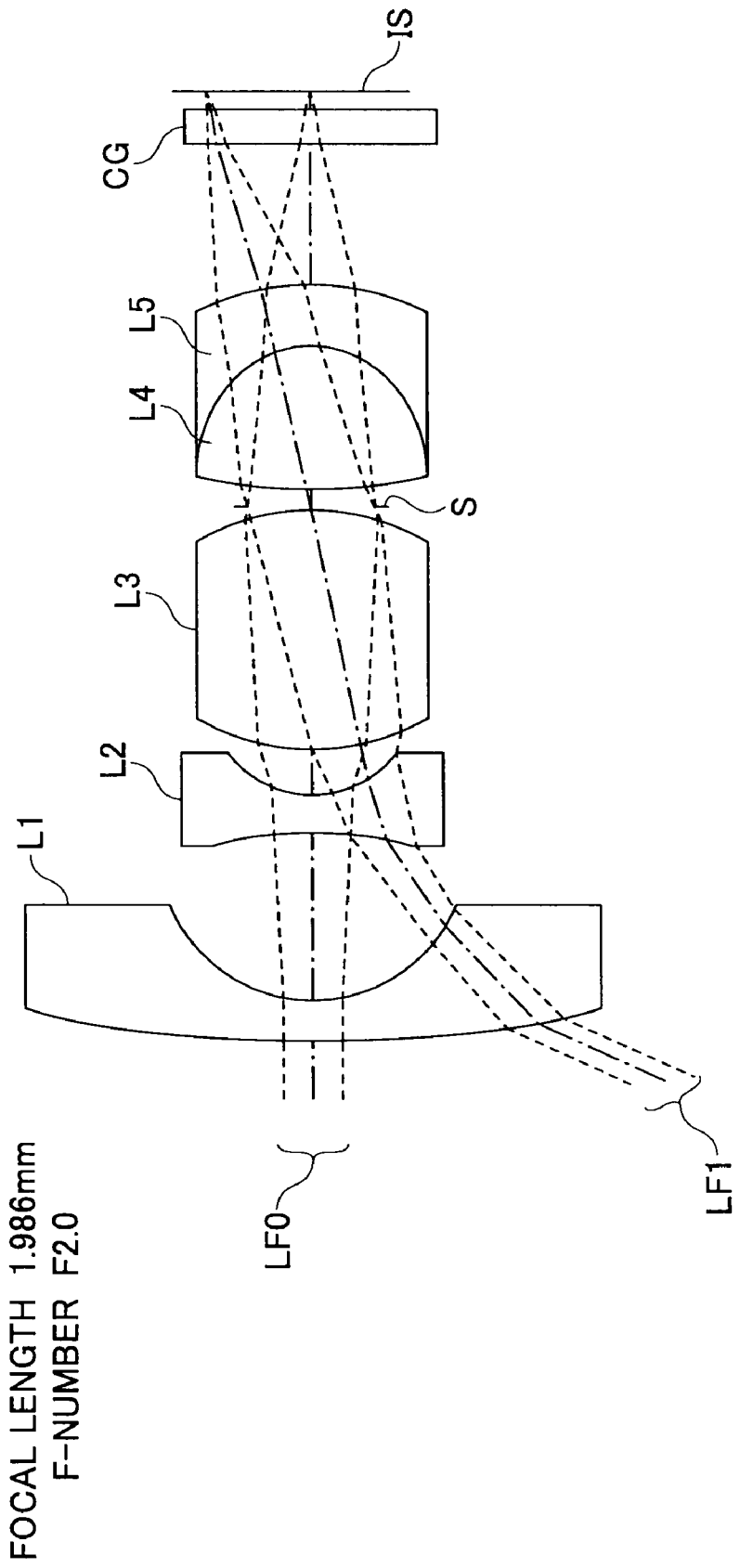

FIG. 1 is a diagram showing a wide-angle lens according to an embodiment of the present invention. This wide-angle lens is described in a first embodiment below.

The wide-angle lens has a first lens L1, a second lens L2, a third lens L3, a fourth lens L4, and a fifth lens L5 arranged from a left hand as an object side to a right hand as an image side in FIG. 1.

The first lens L1 is a "negative meniscus lens with its convex surface directed to the object side." The second lens L2 is a "biconcave lens." The third lens L3 is a "biconvex lens." The first lens L1, the second lens L2, and the third lens L3 constitute a "front group." In other words, the first lens L1, the second lens L2, and the third lens L3 constituting the front group have "negative, negative, and positive" powers, respectively.

The fourth lens L4 is a "biconvex lens" with its surface having a large curvature directed to the image side. The fifth lens L5 is a "negative meniscus lens with its convex surface directed to the image side." The fourth lens L4 and the fifth lens L5 are bonded to each other and constitute a "rear group" as a cemented lens. The fourth lens L4 and the fifth lens L5 after being bonded to each other have a positive power.

An aperture S is arranged at a "position adjacent to a surface on the object side of the fourth lens L4" between the front group and the rear group.

In FIG. 1, reference symbol CG indicates the cover glass of an image pickup device (CCD area sensor), and reference symbol IS indicates an image forming surface. The image forming surface IS is substantially the "light receiving surface of the image pickup device." The image pickup device has two-dimensionally-arranged pixels and converts an "image to be picked up," which is formed by the wide-angle lens, into electronic image data.

Further, reference symbol LF0 indicates an "axial light flux," and reference symbol LF1 indicates a "most off-axis light flux." As is clear from the angle at which the most off-axis light flux LF1 is incident on the first lens L1, the wide-angle lens has a "viewing angle of more than 130°."

The first lens L1 and the second lens L2 are resin aspherical lenses. The third lens L3, and the fourth lens L4 and the fifth lens L5 of the rear group are glass spherical lenses.

The first embodiment is on the premise that magnification chromatic aberration is corrected with the cemented lens (fourth lens L4 and fifth lens L5) of the rear group and that distortion (distortion aberration) is corrected with the aspherical lenses (first lens L1 and second lens L2) of the front group (the same applies to other embodiments below).

First Embodiment

A specific embodiment of the wide-angle lens shown in FIG. 1 is described. Note that the unit of an amount having a length dimension is "mm."

According to the first embodiment, the wide-angle lens has a viewing angle of 136° (semi-viewing angle of 68°) and a focal length of 1.986.

FIG. 2 shows the data of specifications related to the first embodiment. The leftmost column of FIG. 2 indicates "surface numbers" when the surfaces are counted from the surface on the object side of the first lens L1 to the image forming surface IS. The surfaces counted as the surface numbers include the lens surfaces, the surface of the aperture S, the both surfaces of the cover glass CG, and the image forming surface (described as the image surface in FIG. 2).

When the surface numbers are made to correspond to the surfaces of FIG. 1, the surface numbers 1 through 6 indicate the lens surfaces on the object side and the image side of the first lens L1, the second lens L2, and the third lend L3, respectively. Further, the surface number 7 indicates the surface of the aperture S. Further, the surface numbers 8 through 10 indicate the lens surfaces on the object side and the image side of the fourth lens L4 and the fifth lens L5 (the lens surface on the image side of the fourth lens L4 and the lens surface on the object side of the fifth lens L5 are cemented surfaces), respectively. Further, the surface numbers 11 and 12 indicate the surfaces on the object side and the image side of the cover glass CG, respectively. Further, the surface number 13 indicate the image forming surface IS.

"○" marks in the column of aspherical surfaces indicate that the lens surfaces are aspherical. As shown in FIG. 1, the both surfaces (surface numbers 1 and 2) of the first lens L1 and the both surfaces (surface numbers 3 and 4) of the second lens L2 are aspherical. Note that values in the column of "curvature radiuses" in FIG. 2 indicate "paraxial curvature radiuses."

The shapes of the aspherical surfaces are expressed by the following known formula, where h is a coordinate in a direction orthogonal to a light axis, Z is a coordinate in a light axis direction, R is a paraxial curvature radius, K is a cone constant, and A, B, C, D, E, and F are high-order aspherical surface coefficients. Thus, when values are given to A through F, the shapes are specified.

$$Z=(h^2/R)/[1+\{1-(1+K)(h^2/R^2)\}^{1/2}]+Ah^2+Bh^4+Ch^6+Dh^8+Eh^{10}+Fh^{12}$$

FIG. 3 shows the data of the aspherical surfaces according to the first embodiment. The leftmost column of FIG. 3 indicates the "surface numbers."

For example, in FIG. 3, "1.064E-08" represents "1.064× $10^{-8}$."

In other words, the wide-angle lens according to the first embodiment has the front group, the aperture S, and the rear group arranged in this order from the object side to the image side. In the front group, the first lens L1 as a negative meniscus lens with its convex surface directed to the object side, the second lens L2 as a negative lens, and the third lens L3 as a positive lens are arranged from the object side to the image side. In the rear group, the fourth lens L4 as a positive lens and the fifth lens L5 as a negative meniscus lens with its convex surface directed to the image side are arranged from the side of the aperture S to the image side. The fourth lens L4 and the fifth lens L5 after being bonded to each other constitute the cemented lens that has a positive power. Thus, the image forming system of the wide-angle lens is composed of the five lenses as a whole.

The Abbe's number vdL5 (=18.9) of the material of the fifth lens L5 as the negative meniscus lens of the rear group meets the condition vdL5<21.

Further, the wide-angle lens according to the first embodiment has an F-number of 2.0.

The first lens L1 and the second lens L2 are aspherical and resin lenses. Further, the third lens L3, the fourth lens L4, and the fifth lens L5 are glass lenses.

Further, a back-focus (i.e., distance on the light axis from the lens surface on the image side of the fifth lens L5 to the image forming surface) is 3.242 mm, and an entire optical length (i.e., distance on the light axis from the lens surface on the object side of the first lens L1 to the image forming surface) is 15.78 mm. The effective diameter of the first lens L1, which defines the size of the wide-angle lens in a direction orthogonal to the light axis, is smaller than or equal to 13 mm. Thus, the wide-angle lens according to the first embodiment is of a compact size smaller than or equal to the size of the wide-angle lens described in Patent Document 1, etc.

Figure 4:
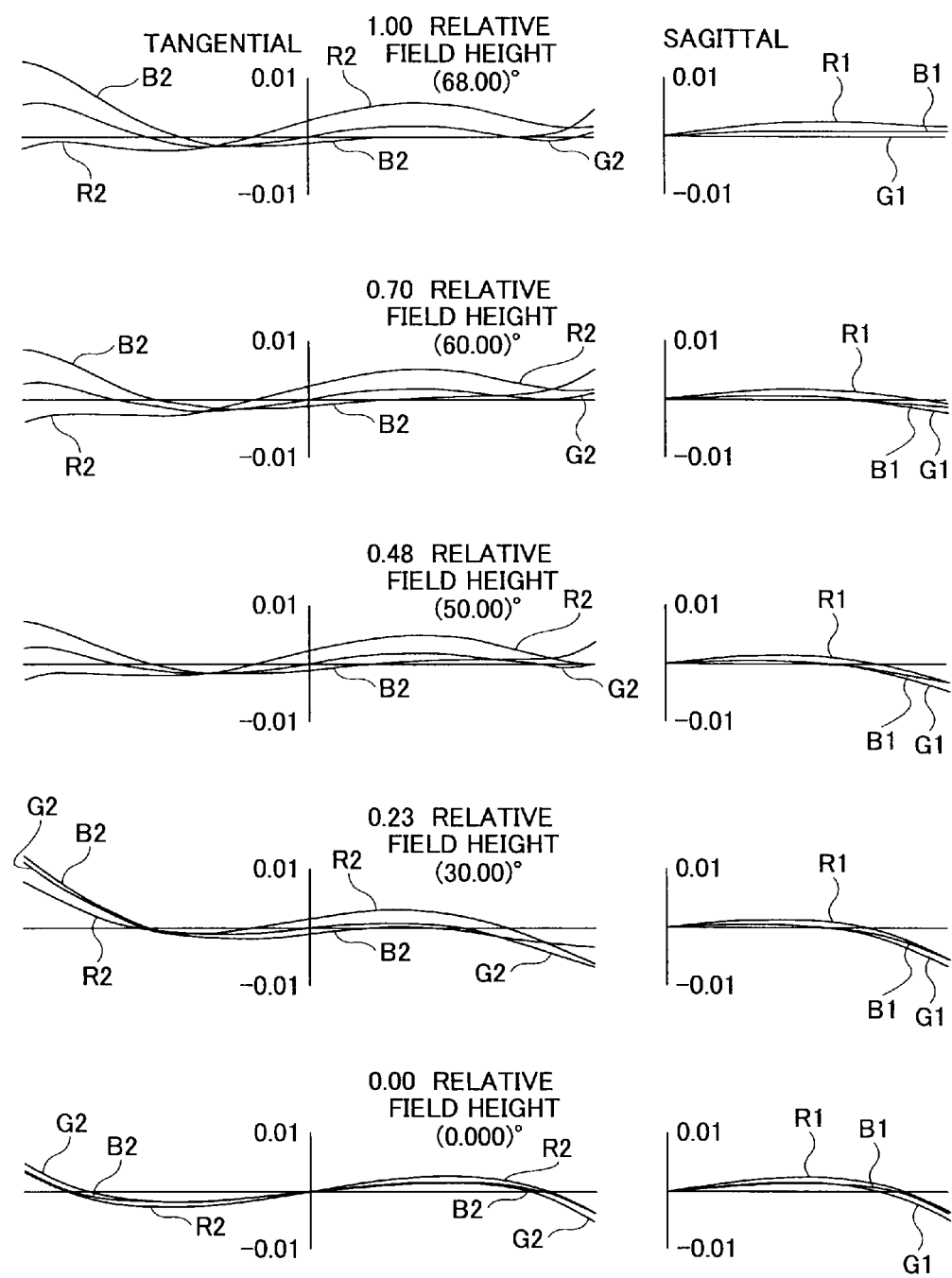
FIG. 4 is a diagram showing coma aberration in the tangential direction and the sagittal direction of the wide-angle lens according to the first embodiment.

FIG. 4 is a lateral aberration diagram including "coma aberration" in the tangential direction and the sagittal direction of the wide-angle lens according to the first embodiment.

Figure 5:
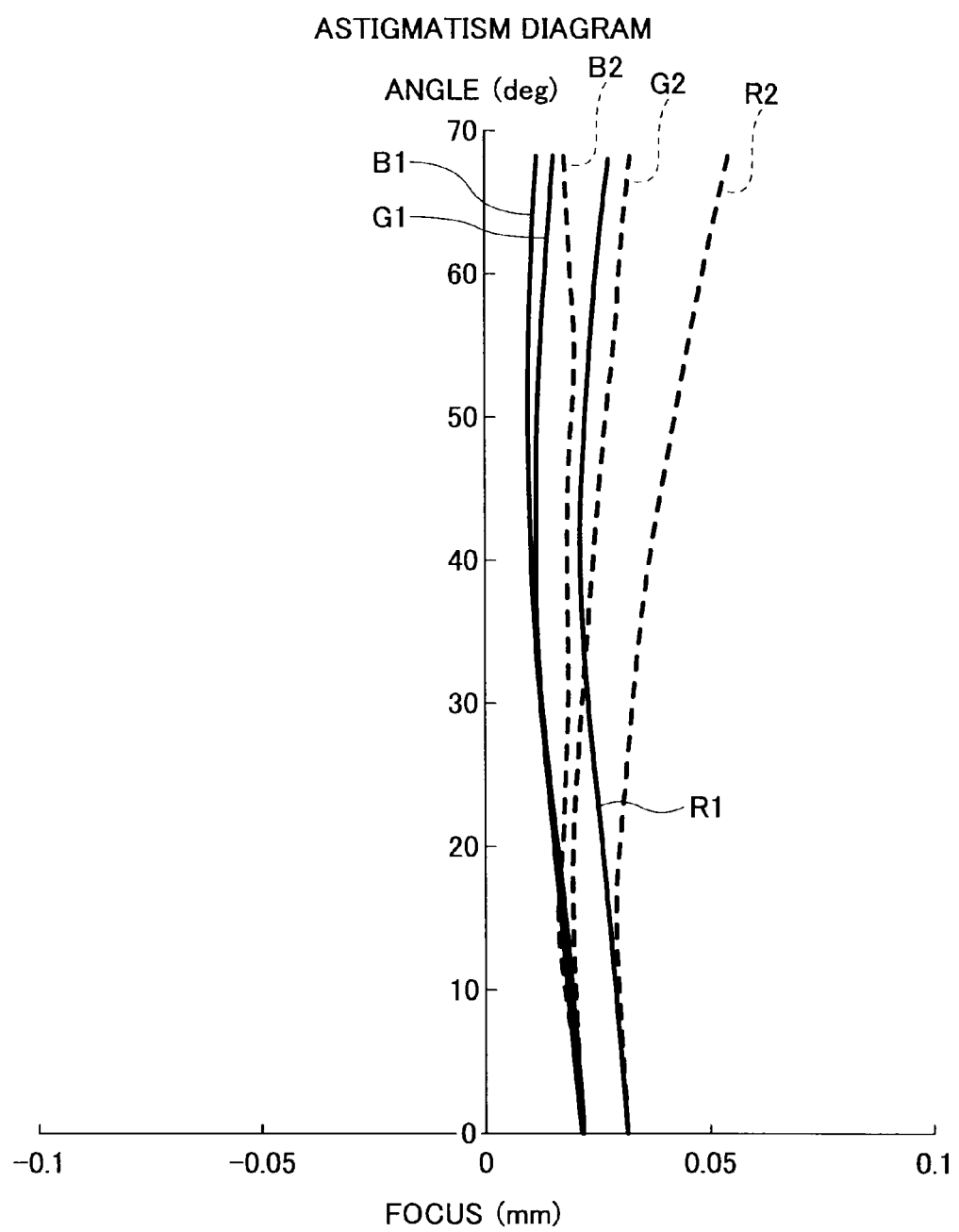
FIG. 5 an astigmatism diagram related to the first embodiment.

Further, FIG. 5 is an astigmatism diagram related to the first embodiment. In FIGS. 4 and 5, "R1 and R2" indicate red light having a wavelength of 650 nm, "G1 and G2" indicate green light having a wavelength of 546 nm, and "B1 and B2" indicate blue light having a wavelength of 477 nm. Further, R1, G1, and B1 are the light in the sagittal direction, while R2, G2, and B2 are the light in the tangential direction.

Figure 6:
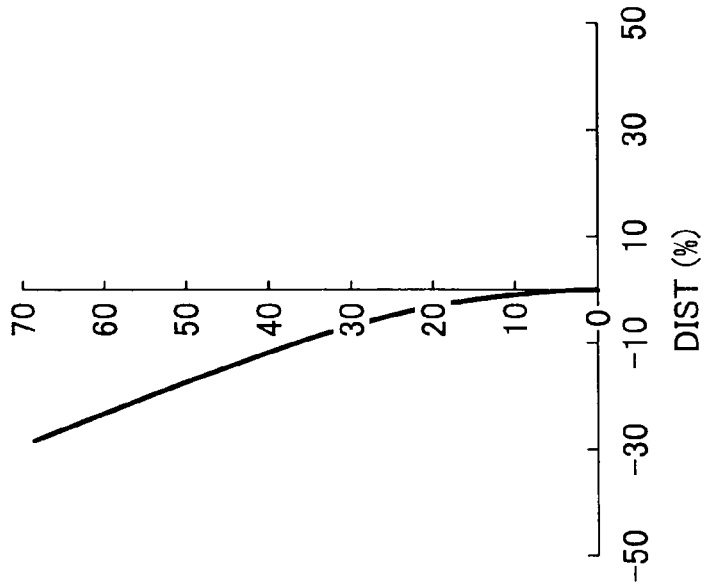
FIG. 6 is a diagram showing distortion aberration related to the first embodiment.

FIG. 6 shows distortion aberration with respect to viewing angles. The left side of FIG. 6 shows calculated values, and the right side shows a distortion aberration diagram. The vertical axis of the distortion aberration diagram indicates a semi-viewing angle (incident angle of an incident flux with respect to the light axis), and the horizontal axis indicates a distortion amount (%). Note that the distortion aberration is calculated based on a three-dimensional projection method in the "vertical direction of an image pickup device," i.e., based on a projection method as expressed by Y=2f·tan(θ/2) where f is a focal length of the wide-angle lens, Y is an image height, and θ is a semi-viewing angle.

Figure 7:
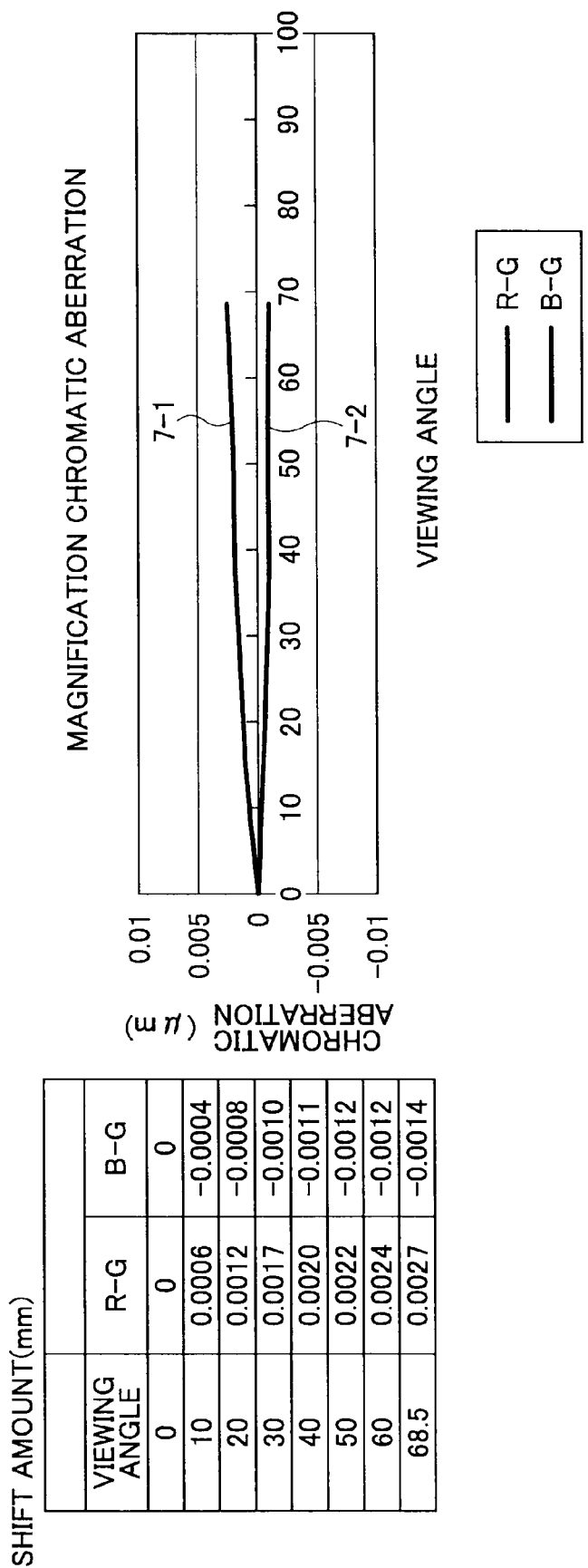
FIG. 7 is a diagram showing relative magnification chromatic aberration related to the first embodiment.

FIG. 7 shows relative magnification chromatic aberration. Specifically, using green light (having a wavelength of 546 nm) as a reference, FIG. 7 shows a "difference (R−G) in magnification chromatic aberration between red light (having a wavelength of 650 nm) and the green light" and a "difference (B−G) in magnification chromatic aberration between blue light (having a wavelength of 477 nm) and the green light." The left side of FIG. 7 shows calculated values, and the right side shows a graph in which a horizontal axis indicates a viewing angle and a vertical axis indicates magnification chromatic aberration. In the graph of FIG. 7, a curved line 7-1 represents the difference "R−G," and a curved line 7-2 represents the difference "B−G."

It is clear from FIG. 7 that the magnification chromatic aberration is very satisfactorily corrected.

Figure 8:
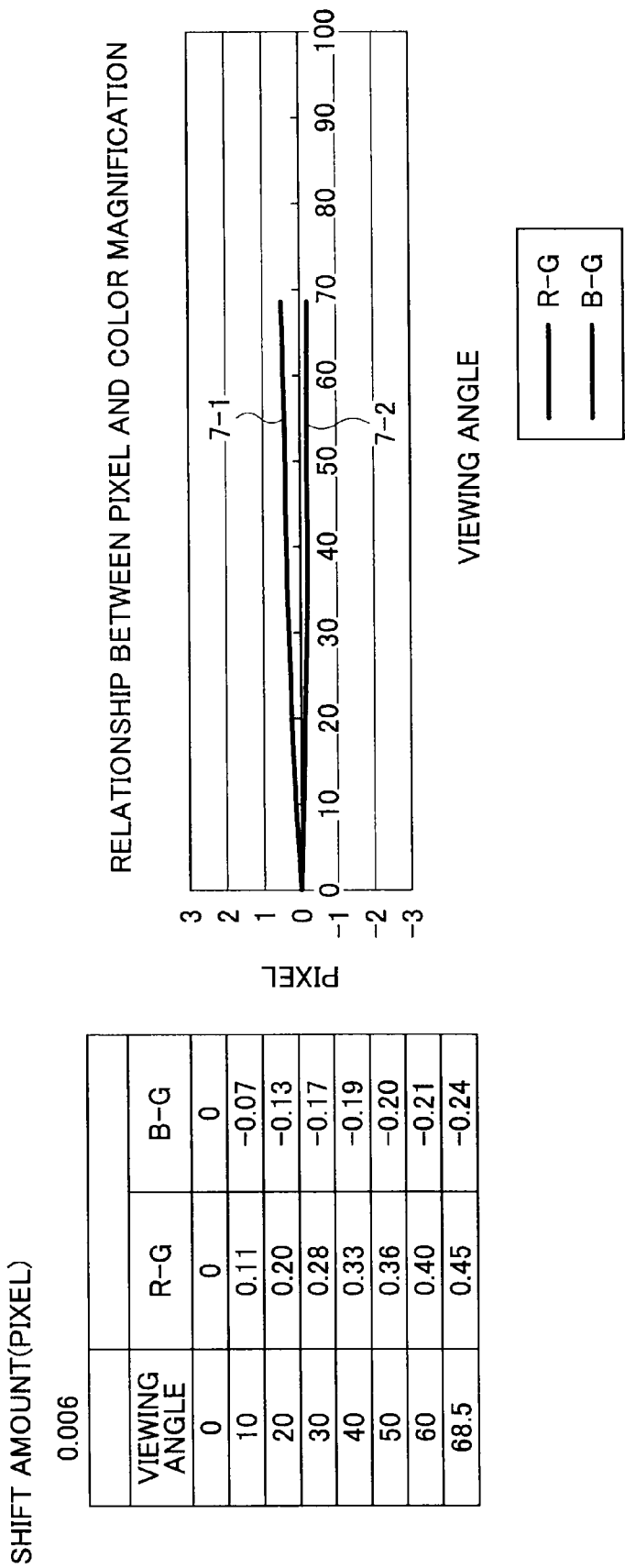
FIG. 8 is a diagram showing relative magnification chromatic aberration (on a pixel basis) related to the first embodiment.

FIG. 8 shows a relationship between the number of pixels and the differences (R−G) (B−G) in the magnification chromatic aberration shown in FIG. 7. The left side of FIG. 8 shows calculated values, and the right side shows a graph. In the graph, a horizontal axis indicates a viewing angle, and a vertical axis indicates the number of pixels. Also, a curved line 7-1 represents the difference "R−G," and a curved line 7-2 represents the difference "B−G."

For example, when the number of pixels of the difference (R−G) in the magnification chromatic aberration at a certain viewing angle is 1, the forming positions of the red light (R) and the green light (G) are shifted by "one pixel relative to each other."

In an example shown in FIG. 8, an interval between the pixels is 0.006 mm (6 μm).

In the first embodiment, the extremely bright lens having an F-number of 2.0 is exemplified. However, with the definition of the lens configuration and the Abbe's number described above according to the present invention, even a lens having an F-number of more than 2.0 (e.g., F-number of 2.4) can similarly provide aberration correction functions such as the chromatic aberration described in the first embodiment.

In other words, even a lens darker than the lens having an F-number of 2.0 can enhance its aberration correction function (the same applies to the embodiments below).

Figure 9:
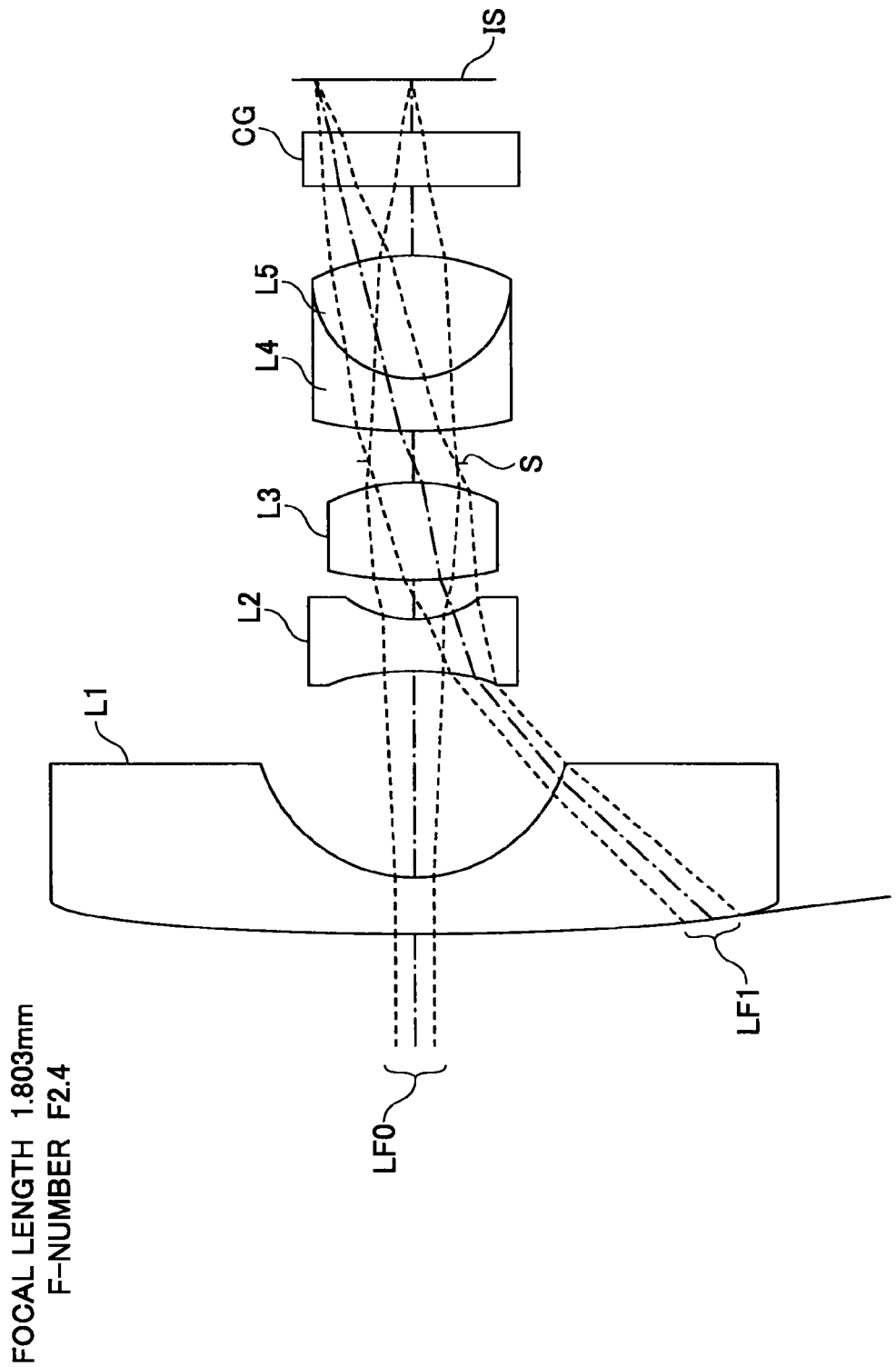

FIG. 9 is a diagram showing a wide-angle lens according to another embodiment of the present invention. This wide-angle lens is described in a second embodiment below.

The second embodiment differs from the first embodiment in that the cemented surface of the cemented lens of a rear group is convex toward an object side. Below, differences between the first and second embodiments are mainly described.

According to this embodiment, a fourth lens L4 is a "negative meniscus lens with its convex surface directed to the object side," and a fifth lens L5 is a "biconvex lens." Similar to the first embodiment, the fourth lens L4 and the fifth lens L5 are bonded to each other and constitute the "rear group" as the cemented lens. The fourth lens L4 and the fifth lens L5 after being bonded to each other have a positive power. Further, the fourth lens L4 and the fifth lens L5 are glass spherical lenses.

Second Embodiment

A specific embodiment of the wide-angle lens shown in FIG. 9 is described. Note that the unit of an amount having a length dimension is "mm."

According to the second embodiment, the wide-angle lens has a viewing angle of 190° (semi-viewing angle of 95°) and a focal length of 1.803.

FIG. 10 shows the data of specifications related to the second embodiment. Rows and columns in FIG. 10 according to this embodiment can be recognized in the same manner as those in FIG. 2 according to the first embodiment. FIG. 11 shows the data of aspherical surfaces according to the second embodiment.

In other words, the wide-angle lens according to the second embodiment has arranged therein a front group, an aperture S, and the rear group in this order from the object side to an image side. In the front group, a first lens L1 as a negative meniscus lens with its convex surface directed to the object side, a second lens L2 as a negative lens, and a third lens L3 as a positive lens are arranged from the object side to the image side. In the rear group, the fourth lens L4 as a negative meniscus lens with its convex surface directed to the object side and the fifth lens L5 as a positive lens are arranged from the side of the aperture S to the image side. The fourth lens L4 and the fifth lens L5 constitute the cemented lens that has a positive power after being bonded to each other. Thus, the image forming system of the wide-angle lens is composed of the five lenses as a whole.

The Abbe's number vdL4 (=18.9) of the material of the fourth lens L4 as the negative meniscus lens of the rear group meets the condition vdL4<21.

Further, the wide-angle lens according to the second embodiment has an F-number of 2.4.

Further, a back-focus (i.e., distance on a light axis from a lens surface on the image side of the fifth lens L5 to an image forming surface) is 3.265 mm, and an entire optical length (i.e., distance on the light axis from a lens surface on the object side of the first lens L1 to the image forming surface) is 15.76 mm. The effective diameter of the first lens L1, which defines the size of the wide-angle lens in a direction orthogonal to the light axis, is smaller than or equal to 13 mm. Thus, the wide-angle lens according to the second embodiment is of a compact size smaller than or equal to the size of the wide-angle lens described in Patent Document 1, etc.

Figure 12:
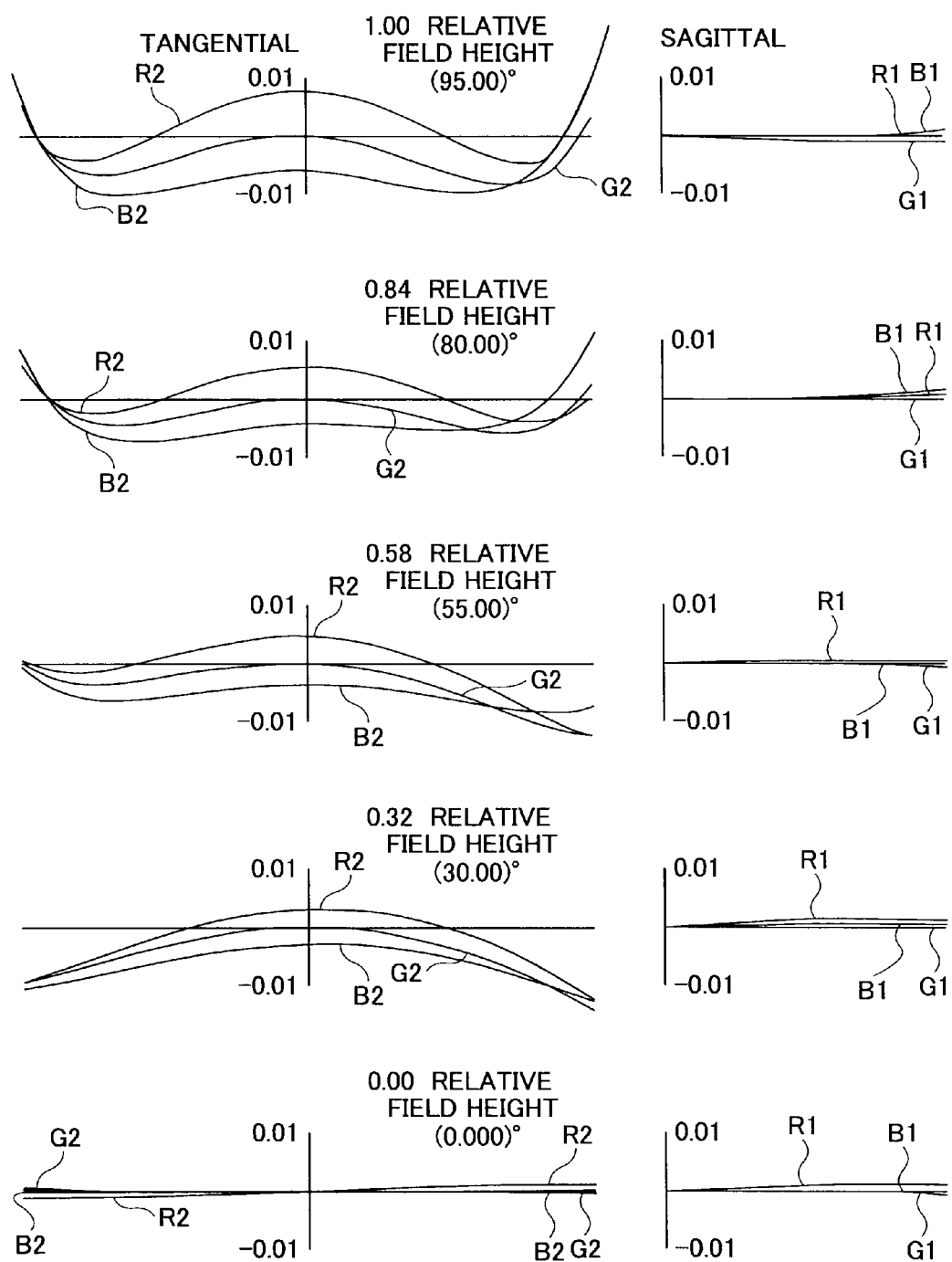
FIG. 12 is a diagram showing coma aberration in the tangential direction and the sagittal direction of the wide-angle lens according to the second embodiment.
Figure 13:
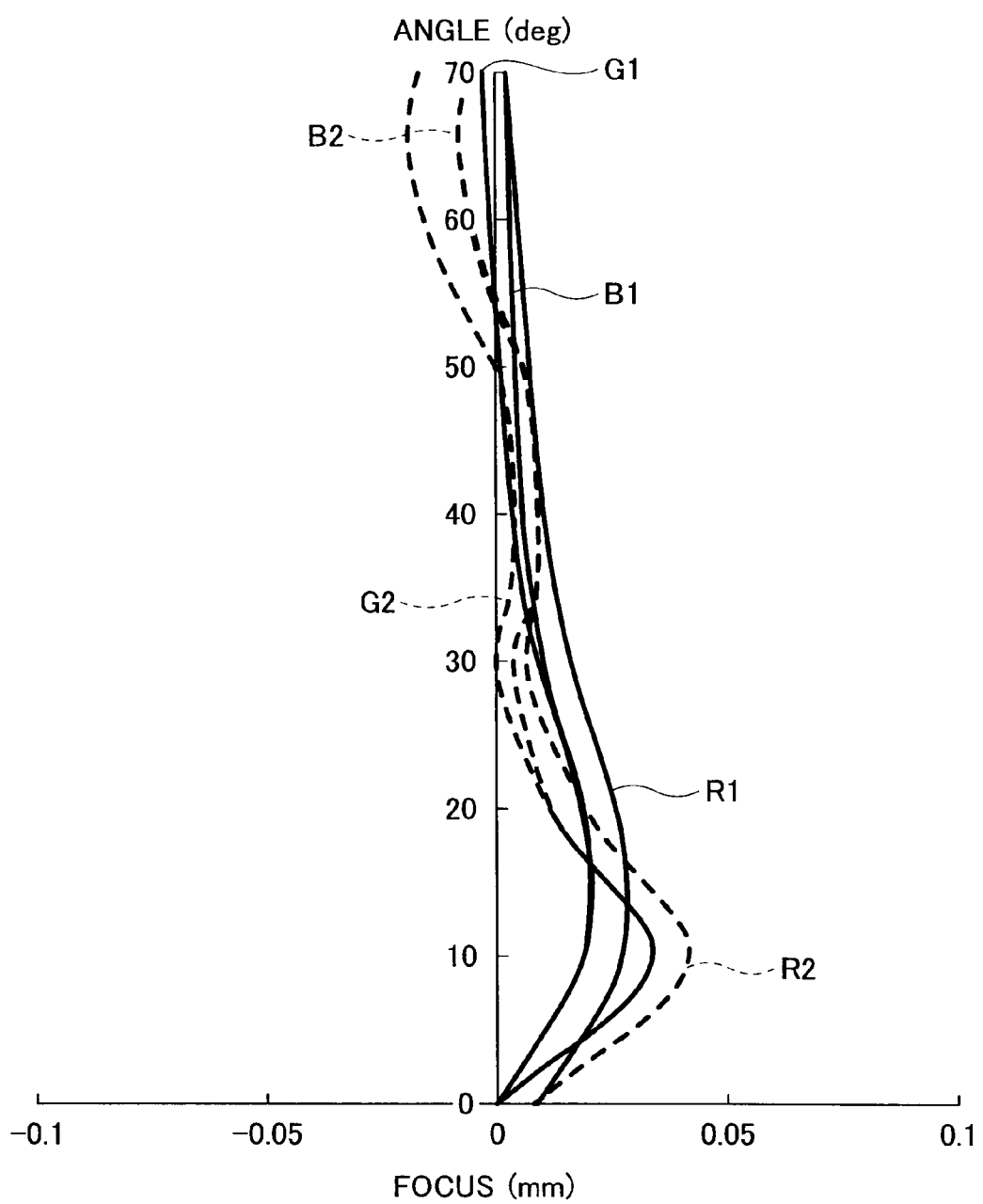
FIG. 13 an astigmatism diagram related to the first embodiment.

FIG. 12 is a lateral aberration diagram including "coma aberration" in the tangential direction and the sagittal direction related to the second embodiment. Further, FIG. 13 is an astigmatism diagram related to the second embodiment. In FIGS. 12 and 13, "R1" indicates red light having a wavelength of 650 nm, "G1" indicates green light having a wavelength of 532 nm, and "B1" indicates blue light having a wavelength of 477 nm.

Figure 14:
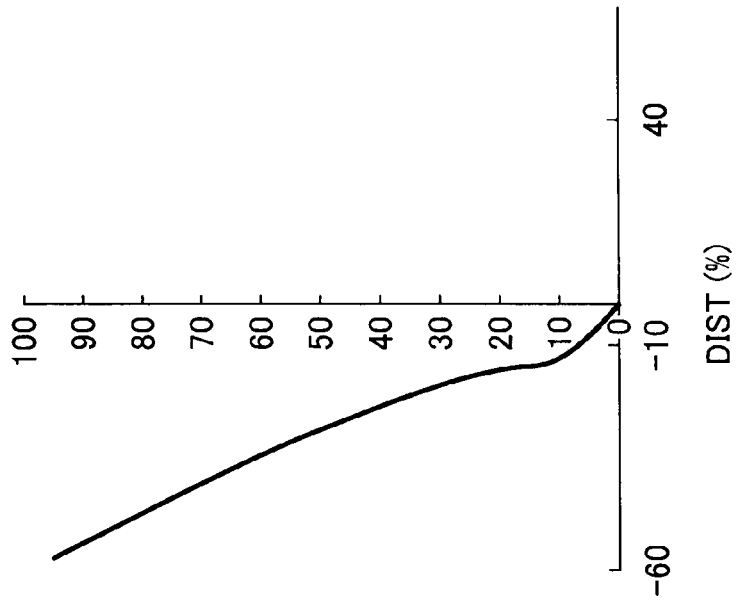
FIG. 14 is a diagram showing distortion aberration related to the second embodiment.

FIG. 14 shows distortion aberration with respect to viewing angles. The left side of FIG. 14 shows calculated values, and the right side shows a distortion aberration diagram. The vertical axis of the distortion aberration diagram indicates a semi-viewing angle (incident angle of an incident flux with respect to the light axis), and the horizontal axis indicates a distortion amount (%). Note that the distortion aberration is calculated based on a three-dimensional projection method in the "vertical direction of an image pickup device," i.e., based on a projection method as expressed by $Y=2f\cdot\tan(\theta/2)$ where f is a focal length of the wide-angle lens, Y is an image height, and $\theta$ is a semi-viewing angle.

Figure 15:
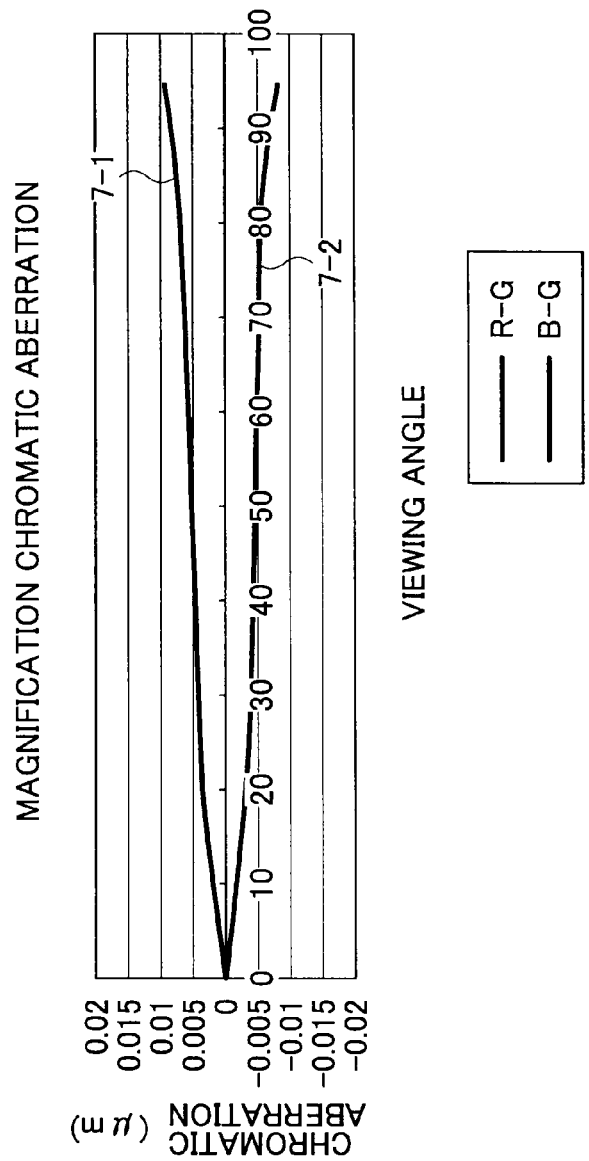
FIG. 15 is a diagram showing relative magnification chromatic aberration related to the second embodiment.

FIG. 15 shows relative magnification chromatic aberration. Specifically, using green light (having a wavelength of 532 nm) as a reference, FIG. 15 shows a "difference (R−G) in magnification chromatic aberration between red light (having a wavelength of 650 nm) and the green light" and a "difference (B−G) in magnification chromatic aberration between blue light (having a wavelength of 477 nm) and the green light." The left side of FIG. 15 shows calculated values, and the right side shows a graph in which a horizontal axis indicates a viewing angle and a vertical axis indicates magnification chromatic aberration. In the graph of FIG. 15, a curved line 7-1 represents the difference "R−G," and a curved line 7-2 represents the difference "B−G."

It is clear from FIG. 15 that the magnification chromatic aberration is very satisfactorily corrected.

Figure 16:
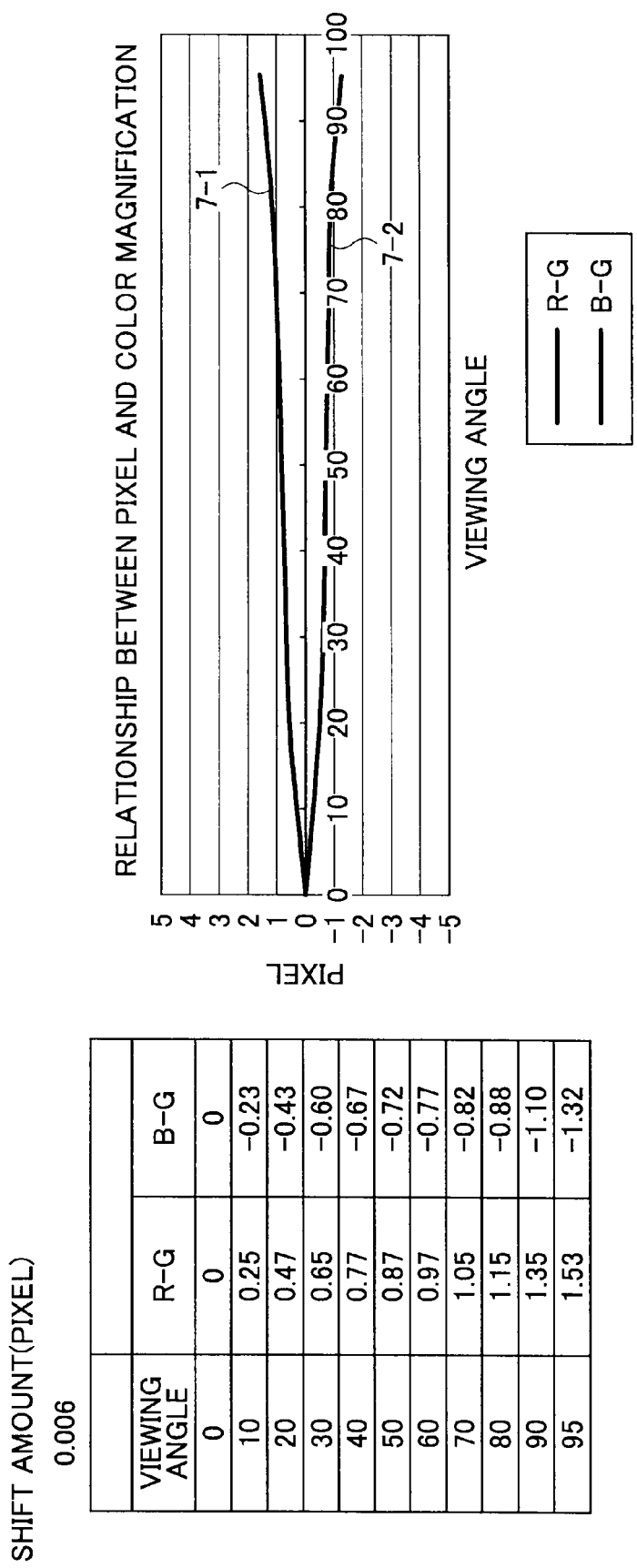
FIG. 16 is a diagram showing relative magnification chromatic aberration (on a pixel basis) related to the second embodiment.

FIG. 16 shows a relationship between the number of pixels and the differences (R−G) (B−G) in the magnification chromatic aberration in FIG. 15. The left side of FIG. 16 shows calculated values, and the right side shows a graph. In the graph, a horizontal axis indicates a viewing angle, and a vertical axis indicates the number of pixels. Also, a curved line 7-1 represents the difference "R−G," and a curved line 7-2 represents the difference "B−G."

For example, when the number of pixels of the difference (R−G) in the magnification chromatic aberration at a certain viewing angle is 1, the forming positions of the red light (R) and the green light (G) are shifted by "one pixel relative to each other."

In an example shown in FIG. 16, an interval between the pixels is 0.006 mm (6 μm).

An image pickup apparatus can be configured by combining the wide-angle lens according to the first and second embodiments with the image pickup device.

As described above, an area sensor such as a CCD (Charge Coupled Device) or a CMOS (Complementary Metal Oxide Semiconductor) device is used as the image pickup device. In other words, the image pickup device has two-dimensionally arranged pixels and converts a subject image (described as the "image to be picked up") formed by a wide-angle lens on a pixel arrangement surface.

An example of the image pickup device combined with the wide-angle lens according to the first and second embodiments can include one that has a rectangular light receiving surface (where a long-side direction is represented by "H" and a short-side direction is represented by "V"). In the rectangular light receiving surface, an interval between pixels is 6 μm in both H and V directions, and 640 (in the H direction)× 480 (in the V direction) pixels are present.

In this case, the effective image pickup area of the light receiving surface has a length of 2.88 mm (in the V direction), a length of 3.84 mm (in the H direction), and a length of 4.80 mm (in a D direction: diagonal direction).

Further, the image pickup apparatus may be configured by combining the wide-angle lens according to the first and second embodiments with the image pickup device and an electronic processing unit.

Figure 17:
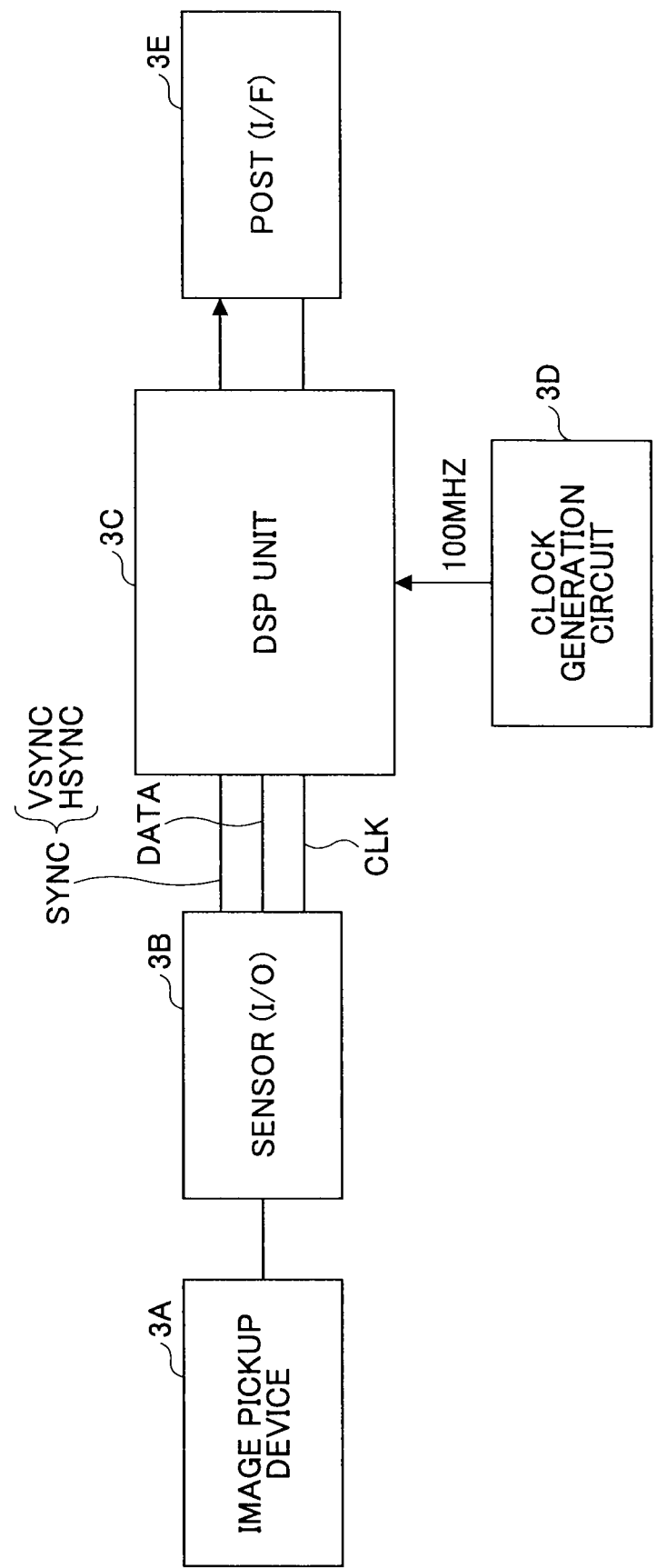
FIG. 17 is a diagram showing a part including an image pickup device and an electronic processing unit in an image pickup apparatus.

FIG. 17 is a diagram showing a part including "the image pickup device and the electronic processing unit" in the image pickup apparatus.

The electronic processing unit refers to a part at the stage subsequent to the image pickup device denoted by reference numeral 3A. The electronic processing unit has a memory that stores image data output from the image pickup device 3A; a memory output controlling circuit that causes image data corresponding to a specified viewing angle to be output from the memory; a first signal processing circuit that corrects the distortion aberration of the wide-angle lens; and a second signal processing circuit that corrects the MTF (Modulation Transfer Function) of the wide-angle lens.

In other words, as shown in a "general block circuit" in FIG. 17, the photoelectric conversion signal of the image pickup device 3A is output from a sensor (I/O) 3B. The sensor (I/O) 3B outputs, for example, an SYNC (V-SYNC, HSYNC) signal, a DATA signal, and a CLK (clock) signal.

The DATA signal is 10-bit for each red, green, and blue color, and the frequency of the CLK signal is, for example, 25 MHz.

These signals are input to a signal processing unit (DSP unit) 3C so as to be processed. The DSP unit 3C has the memory, the memory output controlling circuit, the first signal processing circuit, and the second signal processing circuit as described above.

The hardware configuration of the DSP unit 3C may be of any type so long as it can apply processing described below to an input signal as in the case of a programmable logic processor such as FPGA, a DSP, an ASIC, etc. To the DSP unit 3C is input, for example, a 100 MHz clock signal from a clock generation circuit 3D.

The output of the DSP unit 3C is converted by the post (I/F) 3E into a "desired output of a system," and then output. As a digital output format, YUV422, YUV444, YUV221, etc., are available. In this case, the post (I/F) 3E converts the output into an NTSC format, and outputs the same.

Figure 18:
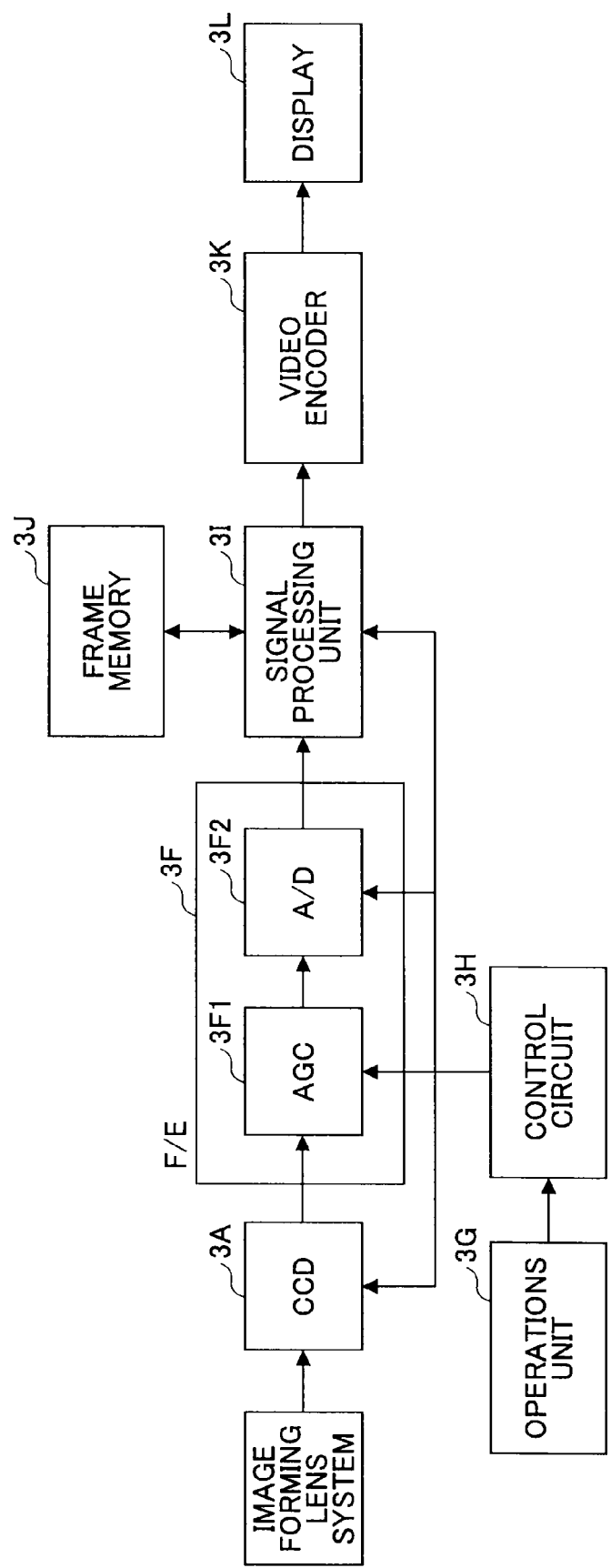
FIG. 18 is a block diagram showing the configuration of the image pickup apparatus in more detail.

FIG. 18 is a block diagram showing the configuration of the "image pickup apparatus" in more detail.

The subject image, which is formed by the image forming lens system (wide-angle lens) shown in FIGS. 1 and 9 on the image surface (image forming surface IS) of the CCD as the image pickup device 3A, is photoelectrically converted by the image pickup device 3A into electronic image data. The subject image formed by the wide-angle lens has the distortion aberration shown in FIGS. 6 and 14.

The image data output from the image pickup device 3A are automatically-gain-controlled by an automatic gain controller 3F1 of a preprocessing unit 3F and then converted by an A/D converter 3F2 into a digital signal so as to be digital image data. Note that the automatic gain controller 3F1 is adjusted by the control of a control circuit 3H based on the operations of an operations unit 3G.

The digital image data are processed by a signal processing unit 3I. The image processing includes processing for improving image degradation due to the image pickup device 3A and processing for improving image degradation due to the wide-angle lens.

The pixels of the image pickup device 3A are arranged by, for example, the Bayer arrangement in which green (G) pixels are larger in number than red (R) pixels and blue (B) pixels. In forming individual R, G, and B images, there occurs a shift in the color images due to a shift in corresponding pixel arrangements only if the R, G, and B image data are taken out and synthesized with each other.

The signal processing unit 3I first performs, for example, the rearrangement of the pixels and processing for correcting white balance between R, G, and B. After the processing for correcting the image degradation due to the image pickup device 3A, the signal processing unit 3I performs processing for correcting MTF degradation and the distortion aberration causing the image degradation due to the image forming lens system.

Note that when the signal processing unit 3I performs such the processing, the R, G, and B image data are temporarily stored in a frame memory (memory) 3J. A control circuit 3H functions also as the memory output controlling circuit that causes image data corresponding to a specified viewing angle to be output from the memory. The image data read from the frame memory 3J are processed by the signal processing unit 3I where necessary.

Figure 19:
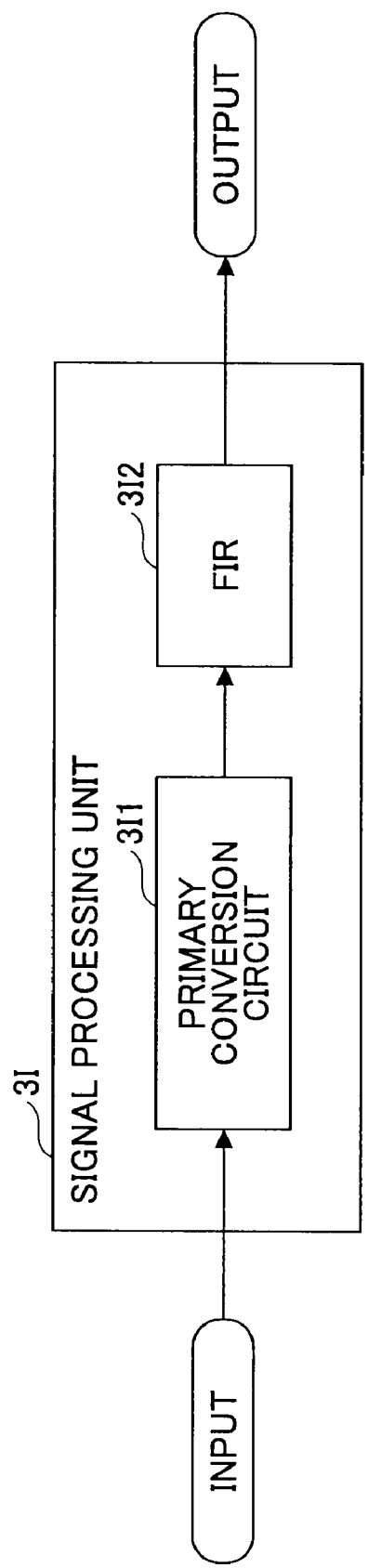
FIG. 19 is a diagram showing the configuration of a signal processing unit in more detail.

FIG. 19 is a diagram showing the configuration of the signal processing unit 3I in more detail. Here, only the configuration of the first signal processing circuit and that of the second signal processing circuit are described in detail.

The first signal processing circuit is configured by a primary conversion circuit 3I1. The second signal processing circuit is configured by an FIR filter circuit 3I2.

To the primary conversion circuit 3I1 are input the R, G, and B digital image data subjected to the processing for correcting the image degradation due to the hardware configuration of the image pickup device 3A. The primary conversion circuit 3I1 applies primary conversion processing to the R, G, and B digital image data. The primary conversion processing is coordinate conversion processing that converts the coordinates of input image data into the coordinates of output image data with mapping in consideration of the distortion of a subject image due to the distortion aberration. Thus, the processing for correcting the distortion aberration is performed.

In other words, since the distortion aberration is specified in advance as the characteristic of the wide-angle lens, it is known or can be actually measured. Therefore, a coordinate conversion formula for converting the coordinates of input image data into the coordinates of output image data can be determined based on the characteristic of the distortion aberration. When the correction processing is performed in accordance with the conversion formula, it is possible to eliminate the distortion aberration, i.e., to obtain image data with their distortion corrected. The conversion formula can be approximated using, for example, a polynominal equation.

Note that in some cases, light amount distribution is changed due to the compression and expansion of the pixels based on the conversion formula, and thus shading may occur. Therefore, irregularities in the light amount are corrected by multiplying the brightness of each of the pixels by a coefficient corresponding to the enlargement factor of the area of the corresponding pixels.

In this manner, the image data with their distortion aberration corrected are input to the next FIR filter 3I2. The FIR filter 3I2 applies processing such as deconvolution to the digital image data output from the primary conversion circuit 3I1.

Thus, the MTF degradation is corrected. As the FIR filter, a Wiener filter and a simple HPF (High pass Filter) may be used.

The present invention is not limited to the specifically disclosed embodiments, and variations and modifications may be made without departing from the scope of the present invention.

The present application is based on Japanese Priority Application No. 2009-091113 filed on Apr. 3, 2009, the entire contents of which are hereby incorporated herein by reference.

What is claimed is:

1. A wide-angle lens having a viewing angle of more than 130°, the wide angle lens having arranged therein a front group, an aperture, and a rear group in this order from an object side to an image side, the front group having arranged therein a first lens as a negative lens, a second lens as a negative lens, and a third lens as a positive lens from the object side to the image side, the rear group being a cemented lens having a positive power when two lenses are bonded to each other, wherein the wide-angle lens includes an image forming system with the five lenses as a whole, the first lens and the second lens of the front group are aspherical lenses, and the third lens is a spherical lens, wherein:

the rear group is composed of a positive lens and a negative meniscus lens, and an Abbe's number vdL of a material of the negative meniscus lens meets a condition vdL <21, and the rear group has arranged therein a fourth lens as the negative meniscus lens and a fifth lens as the positive lens from a side of the aperture to the image side, and the wide-angle lens has a viewing angle of more than 190°.

2. The wide-angle lens according to claim 1, wherein the wide-angle lens has an F-number of 2.0.

3. The wide-angle lens according to claim 1, wherein the first lens and the second lens of the front group are resin lenses, and the third lens and the two lenses of the rear group are glass lenses.

4. An image pickup apparatus having the wide-angle lens according to claim 1 and an image pickup device that converts an image to be picked up, which is formed by the wide-angle lens, into image data.

* * * * *